No. 619,484. Patented Feb. 14, 1899.
M. HOGREFE.
DEVICE FOR INSERTING BALLS IN BEARINGS.
(Application filed Oct. 3, 1898.)
(No Model.)
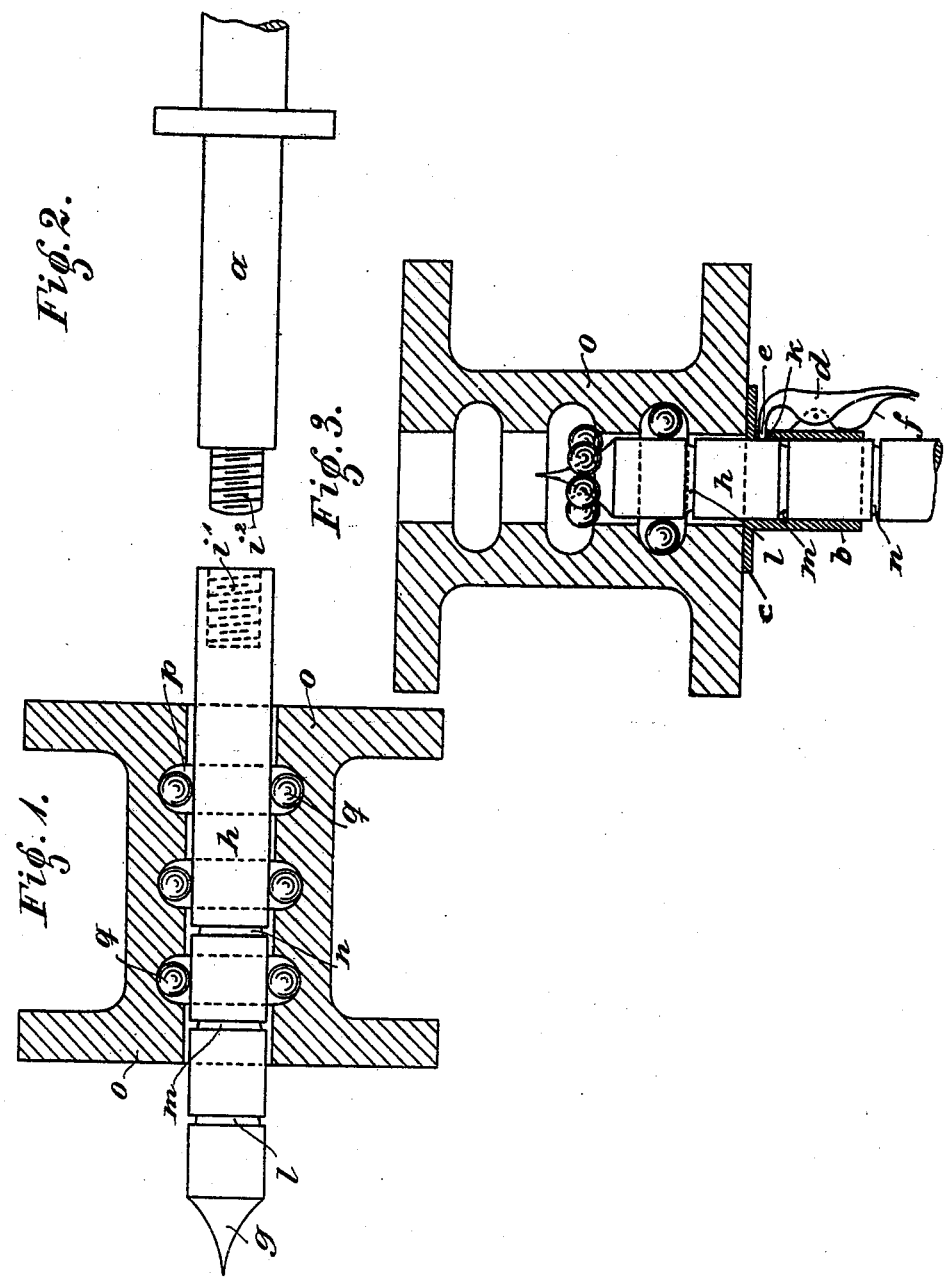
Witnesses:
C. Holloway
W. C. Pinckney
Inventor:
Marius Hogrefe,
By J. E. M. Bowen
Attorney.
THE NORRIS PETERS CO., PHOTO-LITHO., WASHINGTON, D. C.

UNITED STATES PATENT OFFICE.

MARIUS HOGREFE, OF COPENHAGEN, DENMARK.

DEVICE FOR INSERTING BALLS IN BEARINGS.

SPECIFICATION forming part of Letters Patent No. 619,484, dated February 14, 1899.

Application filed October 3, 1898. Serial No. 692,482. (No model.)

*To all whom it may concern:*

Be it known that I, MARIUS HOGREFE, wholesale merchant, of 11 Laderstrade, Copenhagen, in the Kingdom of Denmark, have invented a certain new and useful device for inserting balls in the bearings of wheels or the like and for placing wheels with loose balls in their bearings on horizontal axles, of which the following is a specification.

The object of the present invention is to provide an improved device facilitating the insertion of balls in the bearings of wheels or the like and whereby it will be possible to place wheels with ball-bearings in which the balls are lying loose on horizontal axles.

In the accompanying drawings, Figure 1 shows a longitudinal section through the nave of a wheel of the aforementioned kind with the device inserted. Fig. 2 shows the axle upon which the wheel is to be placed; and Fig. 3 is a longitudinal section through the nave of a wheel, illustrating how the balls are inserted into their respective grooves.

The device consists of a cylindrical body $h$, one extremity of which is formed pointed, like a cone $g$, which may be incurved, as shown in the drawings, while the other end is provided with an interior screw-thread $i'$, corresponding to the screw-threaded projecting part $i^2$ of the axle $a$, which threaded portion when the rod is removed serves for fixing the wheel-cap. The outer diameter of the body $h$ is made exactly the same as the diameter of the axle $a$.

The nave $o$ in Fig. 1 is shown provided with three grooves $p$, for example, for receiving the balls $q$, but the number of the grooves $p$ is immaterial. Such a nave cannot be placed directly on the axle $a$, as it would not be possible to get the balls into their respective grooves and remain there unless the balls were supported from the inside.

The body $h$ is used for facilitating the insertion of the balls into their bearings and for affording the necessary temporary support to the balls. The operation of inserting the balls in position and placing the wheel on the axle-arm is effected as follows:

After the wheel $o$ has been placed horizontally, as shown in Fig. 3, the body $h$, with its conical extremity uppermost, is introduced from underneath into the cylindrical aperture of the nave $o$ of the wheel and pushed upward until the cone is level with the lowest of the grooves $p$. The necessary number of balls $q$ are then filled into the cylindrical aperture and will slide down along the conical head of the body $h$, forming a ring around same. By now pushing the body upward the balls will be forced to the sides and take up their positions in the grooves. The body $h$ is then pushed farther upward until the conical head is level with the next groove, whereupon the balls for this groove are placed in position in the same manner as before and so on until all the grooves have been filled with balls. This operation is illustrated in Fig. 3, where the device is shown in position for placing the balls in the second groove.

In order to limit the insertion of the body $h$ into the nave, so that the end of the body will occupy the proper position in relation to the various grooves to guide the balls into same, the body $h$ may be provided with an adjustable sleeve $b$, as shown in Fig. 3. At one end of the sleeve $b$ is arranged a flange $c$, that can rest against the surface of the nave, and on the side of the sleeve is fixed a double-armed lever $d$, one arm of which is pressed outward by means of a spring $f$, while the other arm terminates in a nose or catch $e$, projecting through a hole $k$ in the said sleeve and pressing against the body $h$.

On the body $h$ is arranged a number of grooves or depressions $l\ m\ n$, the number of these grooves corresponding to the number of grooves in the nave. The grooves on the body $h$ are arranged at the same distance from one another as those in the nave. The uppermost groove $l$ nearest to the point $g$ is arranged so that this point will just be in the proper position for guiding the balls into the lowest groove when the flange $c$ rests against the nave and the nose $e$ catches into the groove $l$. It is evident that when the sleeve $b$ is fixed on the body $h$ in the position where the nose $e$ catches into the groove $m$ the conical point $g$ will have the proper position for guiding the balls into the second groove of the nave.

As long as the body $h$ remains in the nave $o$ of the wheel the balls cannot fall out, and the wheel may therefore be turned so as to assume a vertical position and carried in front of the axle upon which it has to be placed. The part $i'$ of the body $h$ is now, after the sleeve $b$ has been removed, screwed onto the projection $i^2$ of the axle, and as the outside diameters of the body $h$ and the axle are identical the wheel can now be readily pushed over onto the said axle without it being possible for the balls to come out of their grooves. The wheel is now in its proper position, and the body $h$ may be removed, or the axle-arm $a$ may be recessed and screw-threaded internally, a corresponding screwed projection being provided on the body $h$ for fitting therein while the wheel is being pushed from the body $h$ onto the axle $a$, or the recess at the extremity of the axle may be made conical, so as to fit the conical head of the body.

Having now particularly described and ascertained the nature of this invention and in what manner the same is to be performed, I declare that what I claim is—

1. In a device for inserting and holding balls in interior grooves, the combination with body $h$, of a sleeve $b$ on said body, and suitable means for fixing said sleeve in proper position on the body for guiding balls into a groove, substantially as described.

2. The combination with body $h$ having depressions at different parts of its length, of an adjustable sleeve, a lever pivoted on the sleeve and having a nose adapted to enter into said depressions in the body $h$ for the purpose of fixing said sleeve in position, and a spring normally pressing the nose end of the lever forward.

3. The combination with body $h$ having a pointed end $g$, depressions $l$, and means for temporarily holding the body to the end of an axle, of sleeve $b$, and means carried by the sleeve adapted to engage a depression $l$.

Signed at Copenhagen this 17th day of September, 1898.

MARIUS HOGREFE.

Witnesses:
JULES BLOM,
ERNEST BOUTARD.